United States Patent [19]
Gerbaulet

[11] Patent Number: 5,544,040
[45] Date of Patent: Aug. 6, 1996

[54] SYSTEM FOR MANAGEMENT OF COMMON PURCHASE OPERATIONS FOR GOODS AND SERVICES

[76] Inventor: Jean-Pierre Gerbaulet, rue des Abondances, 92100 Boulogne, France

[21] Appl. No.: 193,100
[22] PCT Filed: Aug. 7, 1992
[86] PCT No.: PCT/FR92/00778
  § 371 Date: Jun. 30, 1994
  § 102(e) Date: Jun. 30, 1994
[87] PCT Pub. No.: WO93/03447
  PCT Pub. Date: Feb. 18, 1993

[30] Foreign Application Priority Data

Aug. 9, 1991 [FR] France ................... 91 10168

[51] Int. Cl.⁶ ........................... G06F 19/00
[52] U.S. Cl. ............................ 364/401 R
[58] Field of Search ............. 364/401, 403, 364/404

[56] References Cited

U.S. PATENT DOCUMENTS

| | | | |
|---|---|---|---|
| 4,530,067 | 7/1985 | Dorr | 364/401 |
| 4,547,851 | 10/1985 | Kurland | 364/401 |
| 4,700,297 | 10/1987 | Hagel, Sr. et al. | 364/401 |
| 4,723,794 | 2/1988 | Shannon | 283/60.2 |
| 4,734,858 | 3/1988 | Schlafly | 364/408 |
| 4,775,935 | 10/1988 | Yourick | 364/401 |
| 4,959,686 | 9/1990 | Spallone et al. | 364/401 |
| 4,984,155 | 1/1991 | Geier et al. | 364/401 |
| 5,003,472 | 3/1991 | Perrill et al. | 364/401 |
| 5,231,566 | 7/1993 | Blutinger et al. | 364/401 |
| 5,250,789 | 10/1993 | Johnsen | 364/401 |
| 5,262,938 | 11/1993 | Rapoport et al. | 364/401 |
| 5,267,147 | 11/1993 | Harshaw et al. | 364/401 |
| 5,319,542 | 6/1994 | King, Jr. et al. | 364/401 |
| 5,325,290 | 6/1994 | Cauffman et al. | 364/401 |
| 5,339,239 | 8/1994 | Manabe et al. | 364/401 |
| 5,361,199 | 11/1994 | Shoquist et al. | 364/401 |

FOREIGN PATENT DOCUMENTS

| | | |
|---|---|---|
| 0338770 | 10/1989 | European Pat. Off. . |
| 2216691 | 10/1989 | United Kingdom . |
| WO85/022700 | 6/1985 | WIPO . |

OTHER PUBLICATIONS

IBM Technical Disclosure Bulletin Feb. 1982 vol. 24, No. 9, pp. 4630 & 4631.
Educational and Industrial Television Jun. 1984 pp. 34, 35.

*Primary Examiner*—Donald E. McElheny, Jr.
*Attorney, Agent, or Firm*—Robbins, Berliner & Carson

[57] ABSTRACT

An interactive communications system for facilitating the management of purchases performed by individuals or certain businesses in repetitive manner, characterized in that the apparatuses making up the system comprise input means (10, 16), confirmation means (17), suggestion/selection means (18), memory means (13), and display means (11) for displaying the articles to be purchased, which articles may be selected from preceding lists and/or files without omission or repetition. The list of articles to be purchased is then printed on paper by means of a printer (14) or is transferred to other apparatuses of the system by interface means (15). By networking resident and portable apparatuses, freestanding terminals for giving assistance in decision-making and situated at the point of sale, and optionally information or transaction terminals in a temporary or permanent network, it is possible for the purchaser to obtain in real time all of the information and means required for managing the purchase function, and for the vendor to obtain better knowledge of customers and to satisfy customer requirements better.

10 Claims, 5 Drawing Sheets

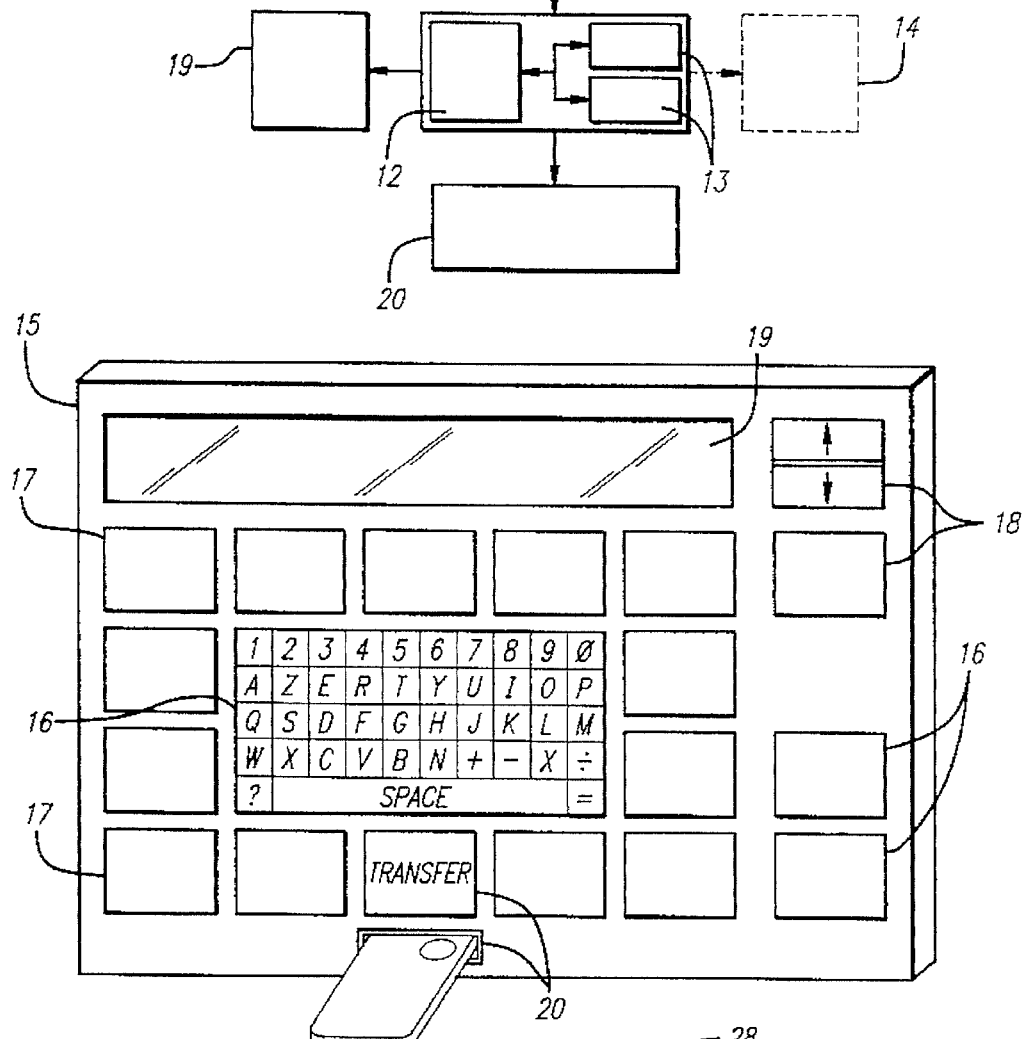
FIG. 4
FIG. 5
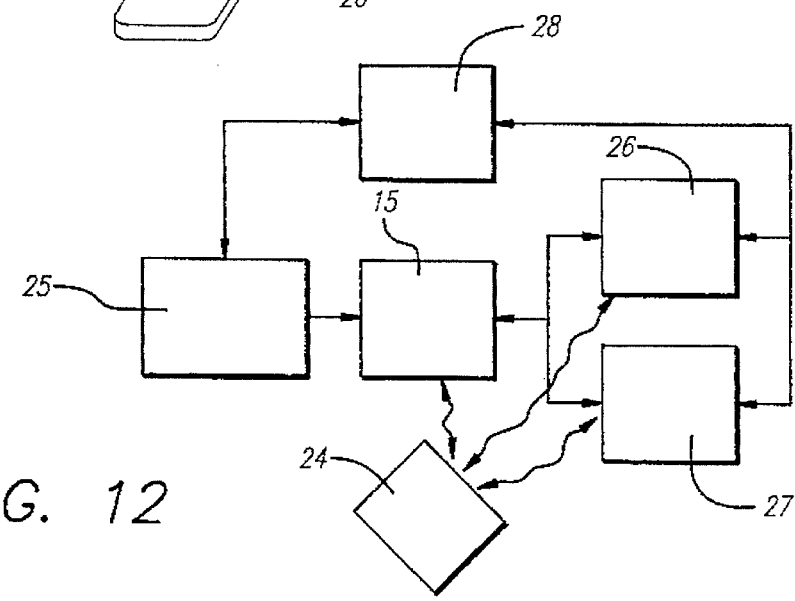
FIG. 12

SYSTEM FOR MANAGEMENT OF COMMON PURCHASE OPERATIONS FOR GOODS AND SERVICES

FIELD OF THE INVENTION

The present invention relates to a system enabling better management to be achieved of common purchase operations for goods and services, particularly domestic purchases performed by individuals and, optionally, supplies for certain businesses.

BACKGROUND OF THE INVENTION

The difficulties encountered by individuals and small firms in managing such operations once they become complex are known; it is also known how fiddly they can become when performed, not occasionally, but habitually and repetitively, and when the articles to be purchased making up a list differ from the preceding list merely by updating, and it can thus be seen how advantageous it would be to be able to bring such a list up to date easily at any time on the basis of information that is current and easily accessible.

Some of the information depends directly on the purchaser, such as stock level or available budget; other information can be parameterized as a function of criteria such as season, purchasing periodicity, number of guests at table, a recipe, or a diet; finally other information is available with the vendor, but is not always accessible to the purchaser when drawing up the list, e.g. article availability, prices, promotions, and sales.

Thus, it would be advantageous for the purchaser to be able to draw up a list of purchases by means of a system that is simple yet effective, without omission and without repetition, even if the list needs to be drawn up over a period of time that is quite long and by several different people independently, and for it to be possible to organize said list automatically as a function of criteria such as type of goods, place of sale, and method of delivery or of payment, thus making it possible to avoid errors and loss of time when ordering goods or making purchases in a store.

Simultaneously, the vendor would like to have a marketing analysis tool available enabling customers to be identified by location, tastes, purchasing habits, and budget, thus making it possible to inform customers of any information relevant to making an order, whenever such information becomes available, thereby offering better service to customers and increasing the vendor's chance of keeping their customers.

Some order-management software makes it possible to manage the making up of the list, but is too complex and inconvenient for use by individuals.

Computer networking makes it possible to interchange data in real time in certain leading professional sectors, such as the travel industry.

In the long term, on-line selling in association with video catalogs should make it possible to simplify and rationalize purchasing by individuals, except insofar as such selling will always be restricted whenever physical contact is necessary or desirable. That has already been proposed in WO-A-85 02700 which describes a system for ordering goods or services by generating data representative of a particular order, which data is sent to a local processor center over telephone lines.

Furthermore, many individuals receive a great deal of information via TV advertising and make purchase decisions before going to the point of sale: they make a list on a wall chart and then copy it down onto a piece of paper shortly before going there. In the long term, freestanding interactive video terminals at the point of sale for providing information and help in decision-making may participate in updating information, but that will nevertheless not make it possible to combine such information with criteria specific to the customer and expressed on a paper list.

SUMMARY OF THE INVENTION

The present invention seeks to mitigate the above drawbacks and to partake of the potential advantages of a communications system constituted by apparatuses having technically similar characteristics but subdivided into three categories depending on how they are embodied and where they are located:

- apparatuses permanently installed in dwellings, offices, etc. . . . referred to as "resident" apparatus;
- portable apparatuses; and
- apparatuses installed at a point of sale, e.g. coupled with a freestanding interactive terminal for providing information and help in decision-making.

Such apparatuses are capable of communicating in interactive manner with their users, in particular a purchaser, and with one another by implementing a network that is temporary or permanent.

BRIEF DESCRIPTION OF THE DRAWINGS

The invention will be well understood from the following description made with reference to the accompanying drawings, in which:

FIG. 4 is a block diagram of a second embodiment of the invention;

FIG. 5 is a front view of a wall-mounted apparatus constituting said second embodiment;

FIG. 12 is a block diagram of a network connection.

DETAILED DESCRIPTION OF THE INVENTION

Figure 1:
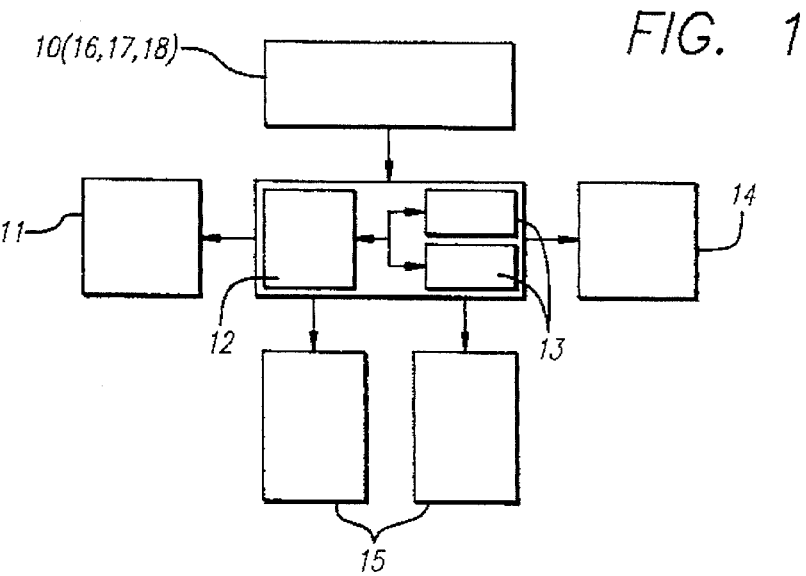
FIG. 1 is a block diagram of typical apparatus forming a portion of the system of the invention.

According to the invention, such an interactive communications system for managing common operations of purchasing goods and services, mainly domestic purchases performed by individuals and optionally supplies for certain businesses, the system comprising apparatuses capable of communicating with one another, and at least one of which comprises first means for inputting purchases to be made, and constituted, for example, by a typewriter-like keyboard, a calculator-like keypad, a touch screen, or other means such as means for recognizing handwriting or voice; second means for providing an alphanumeric, graphics, or video display for displaying the list of purchases to be made or being processed, together with an indication of a purchase category or of other selection criteria; third means for storage purposes in which files of articles constituted by standard lists or by earlier lists are stored for use as a reference when creating new lists; fourth means for storage purposes in which lists that are being drawn up are stored, characterized in that it further comprises fifth means for confirming input and constituted by keys representing various categories of purchase, such as beverages, meat, groceries, bakery, household, pharmacy, cleaning materials, and a "general" category, for example, with said means for confirming input being used after each input to enable the list of purchases to be organized by category independently of the order of input.

According to another characteristic of the invention, the system further comprises means defining a "message" category for interchanging information between the various people participating in creating the list.

According to the invention such apparatus also comprises sixth means for suggestion and/or selection purposes constituted by keys giving access to the contents of third means for storage and enabling said contents to be transferred to the fourth means corresponding to the list that is being created;

In a variant of this embodiment, such suggestion/selection keys and the category-confirmation keys may be the same keys.

In an embodiment of the invention, such apparatus comprises seventh means for output purposes constituted by a printer enabling the list of purchases to be physically printed out on paper.

In an advantageous embodiment of the invention, the apparatus also includes:

eighth means for storage purposes in which various programmable criteria are stored, such as vendor stock levels and article prices, for example, or other more specific criteria such as purchaser stock level, available budget, purchase periodicity, season, number of guests, a recipe, or rules governing a balanced diet; and ninth means for computation purposes, enabling the first and second means to be managed, and in particular serving to sort the articles making up the list stored in the fourth means as a function of criteria stored in the eighth means.

The invention also proposes a system in which the tenth means for computation purposes enabling lists that are being made up and that are stored in the fourth means to be compared with standard lists and/or with preceding lists stored in the third means in order to avoid omissions and repetitions.

In another embodiment of the invention, some of the apparatuses may be made in the form of portable units capable of dialog with other apparatuses of the system via:

eleventh means for connection purposes such as an electrical connector, an infrared connector, or a modem, enabling reading and writing to be performed in external memories implemented in the form of a memory card, ROM, RAM, a magnetic disk, an optical disk, or in some other form.

In another embodiment of the invention, certain apparatuses may be integrated in interactive terminals capable of dialog with other apparatuses of the system via:

eleventh means for connection purposes such as an electrical connector, an infrared connector, or a modem, enabling reading and writing to be performed in external memories implemented in the form of a memory card, ROM, RAM, a magnetic disk, an optical disk, or in some other form.

In another embodiment of the invention, the resident apparatus is connected in a temporary or permanent network with other computer apparatuses, some of which are situated on the premises of the purchaser: a video catalog, a terminal for sending orders to a remote point, and a freestanding terminal for making payment and capable of identifying the purchaser by the security code of a memory card or of an infrared control box, and other apparatuses on vendor premises: an on-line catalog, a central computer for managing the network.

Reference is now made to FIG. 1 which is a block diagram of a standard apparatus forming part of the system, in which the input means (10), the display means (11), the output means (14), and interface means with memory and with external apparatuses (15), are interconnected by computing and storage means (12, 13).

Figure 2:
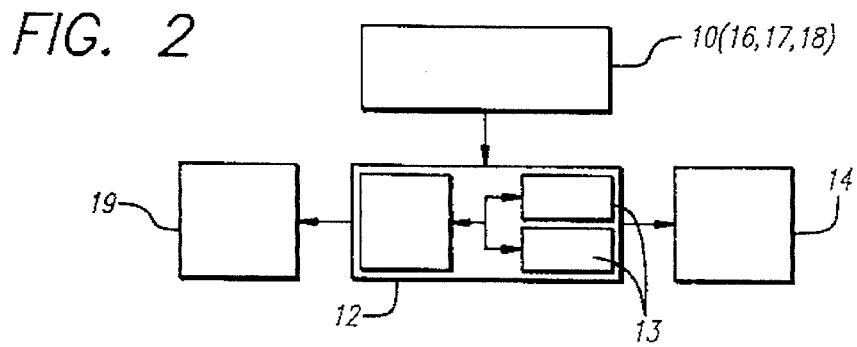
FIG. 2 is a block diagram of a first embodiment of the invention.

Reference is then made to FIG. 2 which is a block diagram of a first embodiment in which the apparatus for facilitating domestic purchases includes a printer (14) suitable for printing the list of purchases to be made on paper.

Figure 3:
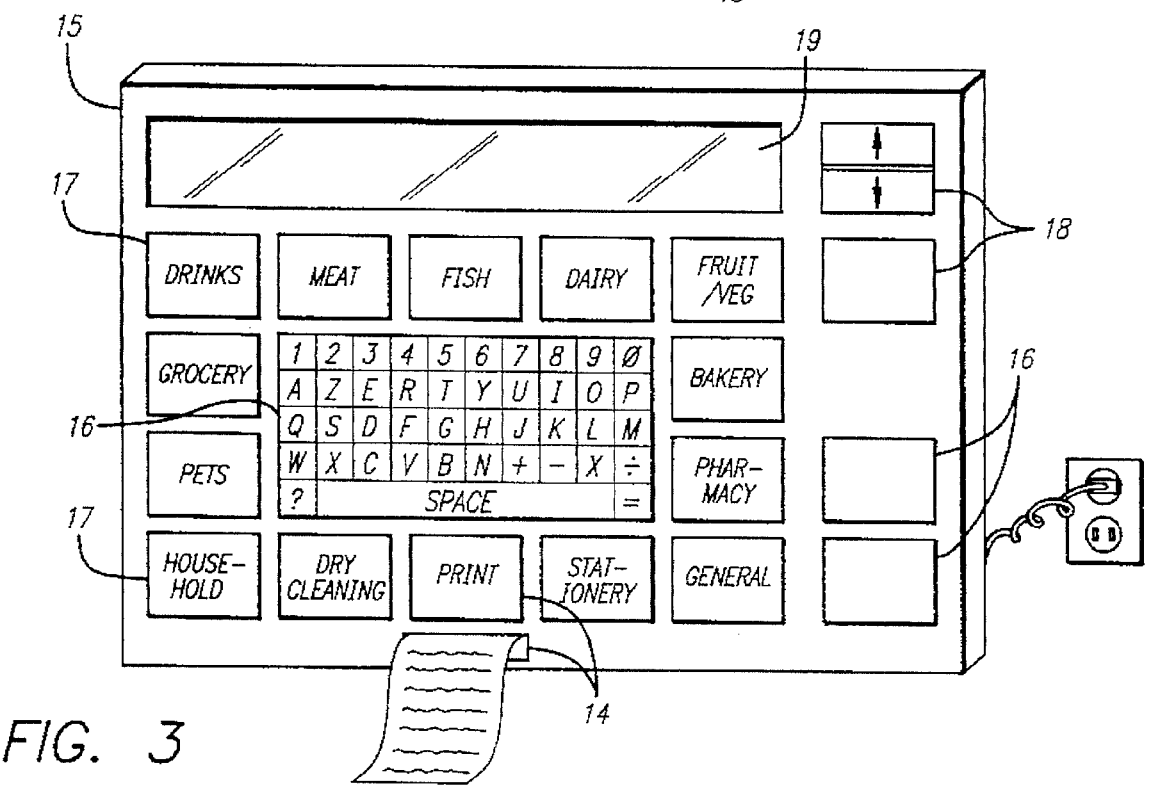
FIG. 3 is a front view of a wall-mounted apparatus constituting said first embodiment.

FIG. 3 is a front view of the apparatus showing said first embodiment in which the apparatus is in the form of a "resident" box, preferably a wall-mounted box (15) having an alphanumeric keyboard (16) thereon together with keys for confirmation (17) and for suggestion and/or selection (18) purposes, an LCD or LED alphanumeric display (19), and a printer (14).

In this embodiment, the special confirmation keys enable the list to be organized and printed in a manner that is independent of the order in which items are keyed in; the apparatus can also keep a record in its memory of the most recent list that it has printed out and use it as a reference for making up the next list; in a preferred variant, the apparatus can store a standard list of articles that is made available via the suggestion/selection key.

This embodiment constitutes a simple version of the invention comprising a single apparatus. In this case, information is conveyed from the purchaser to the point of sale by means of the paper list printed by the resident apparatus. In this embodiment, the vendor has no direct influence on purchase decisions, except insofar as the vendor may be associated in drawing up the standard list which is integrated in the apparatuses.

Reference is now made to FIG. 4 which is a block diagram of a second embodiment in which the "resident" apparatus includes an interface with other apparatuses of the system, said interface being implemented by means of a read/write connector to a removable read/write memory: the memory is dedicated to transferring information between the apparatuses of the system; it may be implemented, for example, by means of a so-called "smart" card, in which case the connector is similar to those used in various banking terminals.

FIG. 5 is a front view of a first variant of the apparatus, illustrating this second embodiment, in which the apparatus is in the form of a resident box (15) having the same characteristics as in the first embodiment shown in FIG. 3, the only difference being that the printer (19) is replaced by a connector for reading and writing in a memory card (20).

Figure 6:
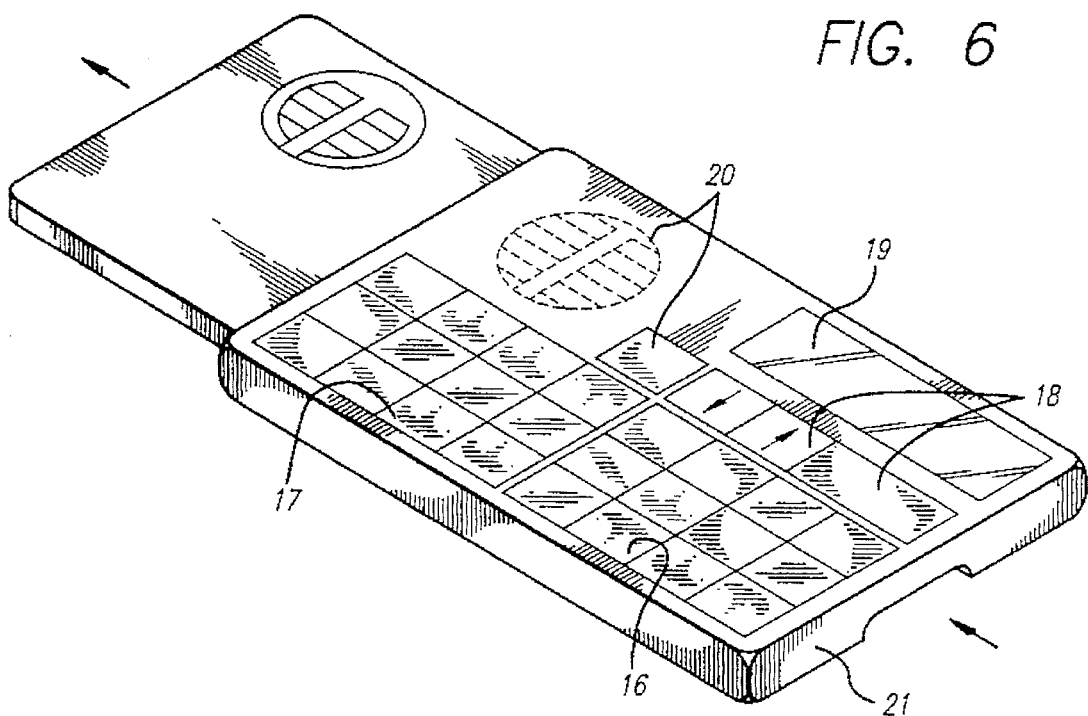
FIG. 6 is a three-quarter view of a portable case for a memory card and constituting a variant of said second embodiment.

FIG. 6 shows another variant of this second embodiment of the apparatus in the form of a portable case for a memory card (21) and performing the same functions as the associated resident apparatus, the connector equipment enabling such a small-sized case to be manufactured being available on the market, e.g. from companies such as Bull CP8, Schlumberger, or Gemplus where the cards are so-called "smart" cards, or from suppliers such as Atari or Sharp who use other technologies for implementing small-sized connectable memories.

The resident apparatus of FIG. 5 and the portable apparatus of FIG. 6 interchange information by means of the memory card or of any other writable removable memory that may be available on the market.

Figure 7:
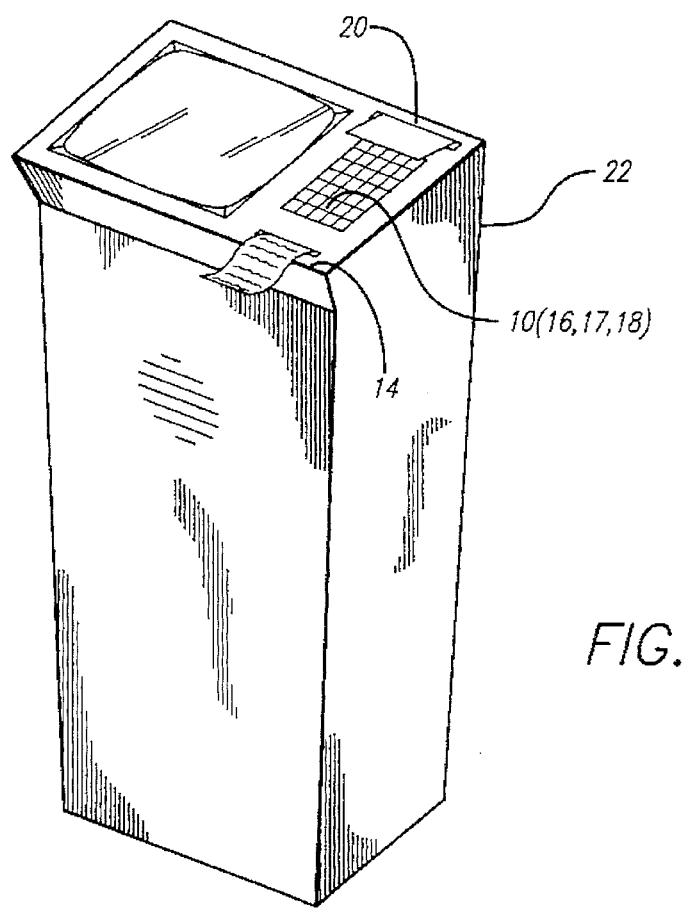
FIG. 7 shows another variant of said second embodiment in which the apparatus is integrated in a freestanding interactive terminal.

FIG. 7 shows a third variant of this second embodiment, in which the apparatus is integrated in a freestanding interactive terminal (22):

this apparatus is capable of communicating with other apparatuses of the system by means of its memory card interface connector (20), and of printing out the list of purchases on paper by means of its printer (19);

it also serves to organize said list as a function of the floor plan of the store, optionally providing a diagram of where to find various departments, together with advice, suggestions, and advertising relevant to immediate purchase.

The purchaser can then collect the goods using the list on paper, take delivery of the purchases at the checkout if so desired, or else order home delivery.

The apparatus is also capable of identifying the customer, of using a computer interface (not shown in the drawings but of conventional technology) to transfer information concerning the customer to a central computer that will give repeat purchase bonus points, discounts, or other advantages, and to write information into the memory of the card that the purchaser can read either by means of the portable apparatus, or later on by means of the resident apparatus.

Figure 8:
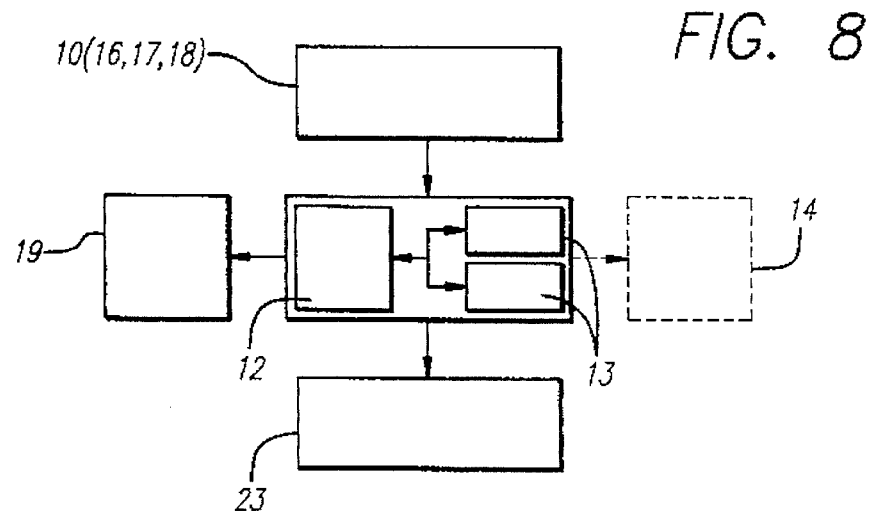
FIG. 8 is a block diagram of a third embodiment of the invention.

Reference is now made to FIG. 8 which is a block diagram of a third embodiment of the apparatus of the invention in which the interface between various different apparatuses is implemented by means of a remote communications device (23), e.g. using infrared radiation.

Figure 9:
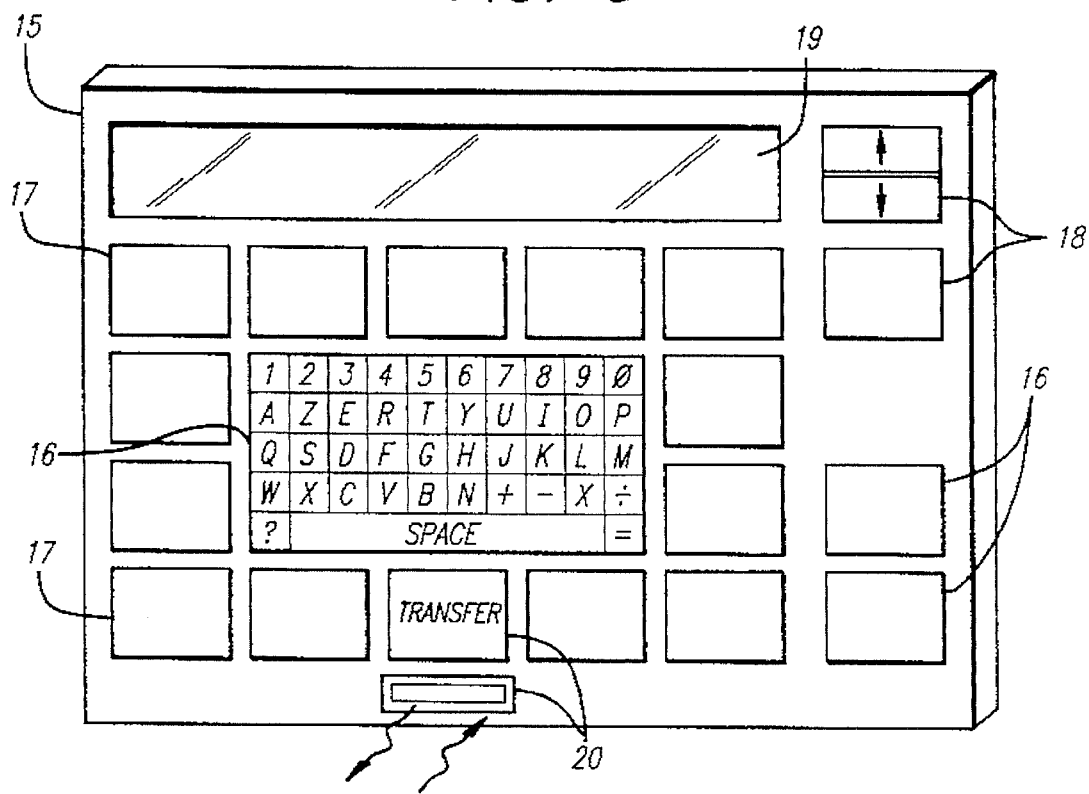
FIG. 9 is a front view of a wall-mounted apparatus constituting said third embodiment of the invention.

FIG. 9 is a front view of a first variant of the apparatus illustrating this third embodiment, in which the resident apparatus has the same characteristics as in the first variant of the second embodiment shown in FIG. 5, the only difference being that the connector for interfacing a memory card (20) is replaced therein by an infrared device (23) capable of operating both for transmission and for reception.

Figure 10:
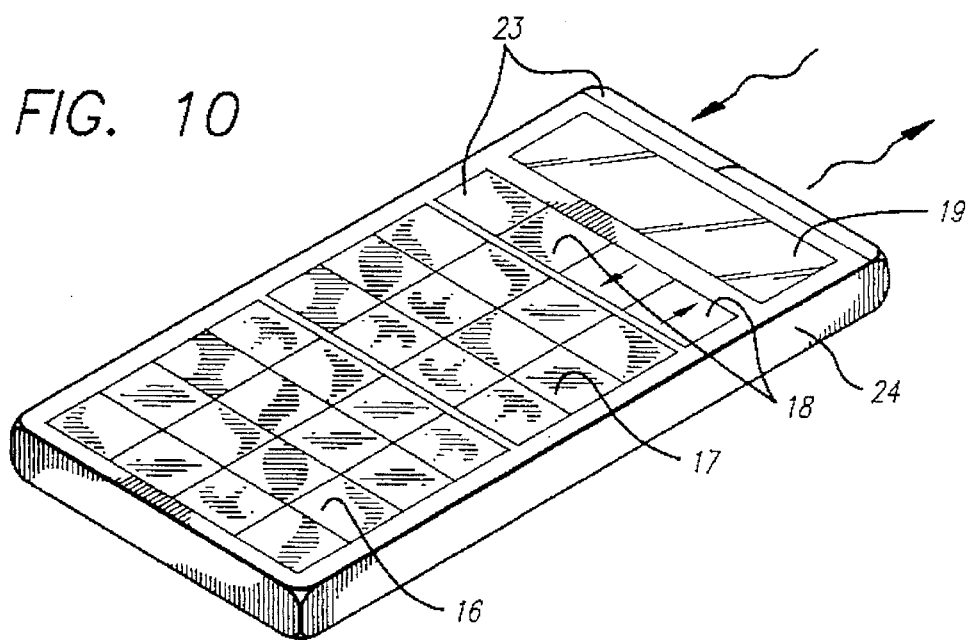
FIG. 10 shows a variant of said third embodiment as a three-quarter view of a remote control box.

FIG. 10 shows a second variant of said third embodiment of the apparatus in the form of a box (24) performing the same functions as the associated resident apparatus, the two apparatuses being capable of interchanging information by means of the infrared device (23) of a kind commonly used for remote control in numerous consumer audiovisual appliances.

This apparatus may be in the form of a pocket-sized box (24) that can be placed on, or fixed to, a shopping cart while making purchases, and the list can be scrolled on its display.

Figure 11:
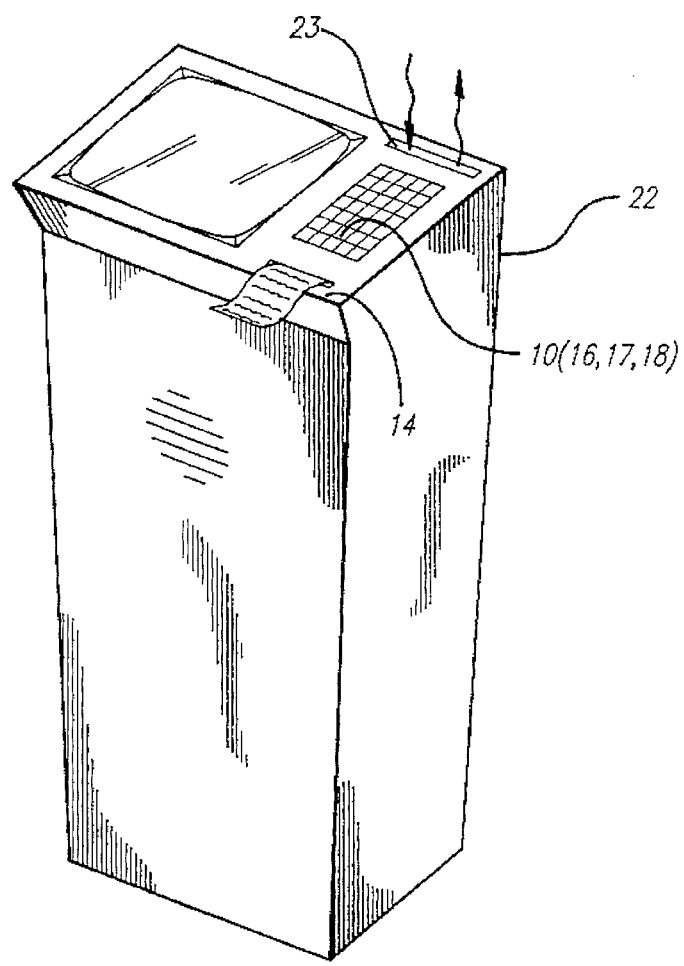
FIG. 11 shows another variant of said third embodiment in which the apparatus is integrated in a freestanding interactive terminal.

FIG. 11 shows a third variant of this third embodiment, in which the apparatus is integrated in a freestanding interactive terminal (22):

this apparatus is capable of communicating with other apparatuses by means of the infrared device (23), and of printing out the list of purchases on paper by means of its printer (14).

This variant also possesses the same options as the "freestanding" variant of the second embodiment.

Finally, reference is made to FIG. 12 which shows a fourth embodiment of the system of the invention, corresponding to making purchases remotely and enabling the list of purchases to be generated, the order to be made, delivery requests to be made, and payment to be made all without travelling.

In this embodiment, the resident apparatus (15) is mounted in a temporary or permanent network together with other computer apparatuses situated:

some of them on purchaser premises: video catalog (25), terminal for making a remote order (26) and payment terminal (27) capable of identifying the purchaser by the security code of a memory card or of an infrared control box (24); and some of them on the premises of the vendor: on-line catalog (25), and central computer controlling the network (28).

I claim:

1. A computer system for preparing a list of food items to be purchased comprising:

a processor;

a display;

a temporary memory storage means for storing said list of purchases;

a permanent memory storage means for storing a standard list of purchases organized according to various categories of purchases and programmable selection criteria based on rules for a balanced diet;

the processor sorting the list of purchases to be made by categories of purchases; and a keyboard comprising dedicated keys for directly selecting and displaying one of said category of purchases of said standard list and a key for copying selected items from the permanent storage means for storing the standard list of purchases to the temporary storage means for storing said list of purchases to be made.

2. The computer system according to claim 1, wherein the processor compares the list of purchases to be made stored in the temporary memory storage means with the standard list of purchases and with selection criteria based on rules for a balanced diet stored in the permanent memory storage means and displays on said display a list of purchases modified according to said criteria.

3. The computer system of claim 2, wherein the temporary memory storage means is a RAM, the permanent memory storage means is a ROM.

4. The computer system according to claim 3, wherein said computer systems is a portable computer.

5. The computer system according to claim 4, further comprising a bi-directional computer communication interface.

6. The computer system according to claim 5, wherein the bi-directional communication interface is an infrared communication interface.

7. A computer network comprising a store computer system temporary connected to at least one computer system according to claim 5.

8. The computer network according to claim 7, wherein the store computer is an on-line catalog.

9. A computer system comprising apparatuses capable of communicating with one another:

i) a first portable apparatus containing:
- a processor;
- a display
- a temporary memory storage means for storing a list of purchases;
- a permanent memory storage means for storing a standard list of purchases organized according to various categories of purchases and programmable selection criteria;
- the processor sorting the list of purchases to be made by categories of purchases;
- a keyboard comprising dedicated keys for directly selecting and displaying one of said category of purchases of said standard list and a key for copying selected items from the permanent storage means for storing the standard list of purchases to the temporary storage means for storing said list of purchases to be made; and
- a bidirectional computer communication interface;

ii) a second wall-mounted apparatus comprising:
- a processor;
- a display;
- a temporary memory storage means for storing said list of purchases;
- a permanent memory storage means for storing a standard list of purchases organized according to various categories of purchases and programmable selection criteria;
- the processor sorting the list of purchases to be made by categories of purchases;
- a keyboard comprising dedicated keys for directly selecting and displaying one of said category of purchases of said standard list and a key for copying selected items from the permanent storage means for storing the standard list of purchases to the temporary storage means for storing said list of purchases to be made; and
- a bidirectional computer communication interface;

iii) a shop computer comprising a free-standing interactive terminal containing a bidirectional communication interface.

10. A computer system according to the claim 9 wherein the bidirectional communication interface is an infrared communication interface.

* * * * *